United States Patent [19]

Niikura

[11] Patent Number: 4,898,049
[45] Date of Patent: Feb. 6, 1990

[54] ELECTRO-HYDRAULIC CONTROL FOR REDUCING ENGAGEMENT SHOCK IN AN AUTOMATIC TRANSMISSION

[75] Inventor: Yasuhiro Niikura, Yokosuka, Japan
[73] Assignee: Nissan Motor Co., Ltd., Japan
[21] Appl. No.: 69,201
[22] Filed: Jul. 2, 1987

[30] Foreign Application Priority Data

Jul. 7, 1986 [JP] Japan .......................... 61-103836[U]

[51] Int. Cl.$^4$ .............................................. B60K 41/10
[52] U.S. Cl. ........................................ 74/866; 74/861;
192/0.033; 192/103 F; 364/424.1
[58] Field of Search ............... 192/0.032, 0.033, 0.052,
192/0.076, 0.092, 0.096, 3.58, 103 R, 103 F;
74/866, 861; 364/424.1

[56] References Cited

U.S. PATENT DOCUMENTS

| | | | |
|---|---|---|---|
| 3,956,947 | 5/1976 | Leising et al. | 74/866 |
| 4,224,842 | 7/1980 | Rabus et al. | 74/866 |
| 4,295,551 | 10/1981 | Zimmermann et al. | 192/0.076 |
| 4,343,387 | 8/1982 | Hofbauer | 192/0.076 |
| 4,346,622 | 8/1982 | Pierce | 74/695 X |
| 4,430,908 | 2/1984 | Stockton | 74/695 X |
| 4,485,443 | 11/1984 | Knödler et al. | 192/0.033 |
| 4,503,734 | 3/1985 | Acker | 192/0.032 |
| 4,514,811 | 4/1985 | Daubenmier et al. | 192/0.033 |
| 4,527,678 | 7/1985 | Pierce et al. | 74/866 |
| 4,638,898 | 1/1987 | Braun | 192/0.076 |
| 4,645,048 | 2/1987 | Inoue | 192/0.096 |
| 4,667,540 | 5/1987 | Yagi | 74/866 |
| 4,730,708 | 3/1988 | Hamano et al. | 192/0.092 X |
| 4,775,938 | 10/1988 | Hiramatsu | 74/866 X |
| 4,803,901 | 2/1989 | Hamano et al. | 74/866 |

FOREIGN PATENT DOCUMENTS

| | | | |
|---|---|---|---|
| 0001828 | 1/1982 | Japan | 192/103 R |
| 58-128552 | 8/1983 | Japan . | |
| 60-220247 | 11/1985 | Japan . | |
| 0125928 | 6/1986 | Japan | 192/0.096 |
| 0125929 | 6/1986 | Japan | 192/0.096 |

Primary Examiner—Dwight G. Diehl
Assistant Examiner—Harold F. Macris
Attorney, Agent, or Firm—Leydig, Voit & Mayer

[57] ABSTRACT

In a control system for controlling engagement of a frictional element, such as a clutch, the derivative of the speed of an input member, such as a turbine shaft, of a transmission is calculated and compared to a target value. The difference, i.e., error, between the values is employed to control, hydraulically, the engagement of the frictional element. The control system operates the frictional element to reduce the error toward zero. This control routine operates only when the vehicle is idling.

5 Claims, 6 Drawing Sheets

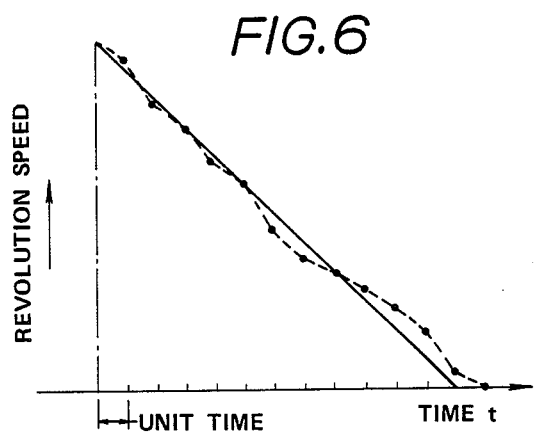
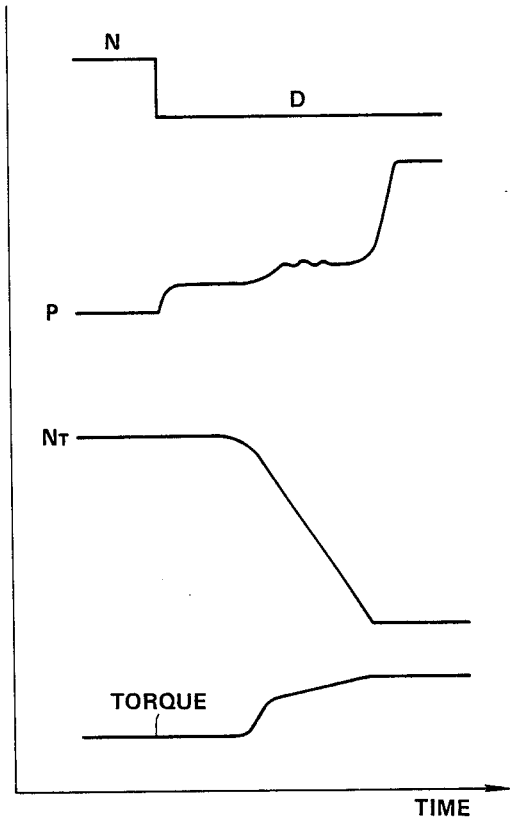

ELECTRO-HYDRAULIC CONTROL FOR REDUCING ENGAGEMENT SHOCK IN AN AUTOMATIC TRANSMISSION

BACKGROUND OF THE PRESENT INVENTION

The present invention relates to a control system for controlling shock occurring upon the engagement of a torque transmitting frictional element in an automatic transmission.

Commonly, in an automatic vehicle having an automatic transmission, a so-called creep phenomenon occurs after the vehicle has come to a halt with the transmission selector placed in the D position. The creep occurs because a torque-transmitting frictional element remains engaged in order to maintain a torque delivery path for ease of subsequent start-up of the vehicle. Engine torque multiplied by the torque converter is thus supplied via the torque delivery path to the driving wheels of the vehicle even when the engine is idling. In order to solve this problem, it has been proposed in JP-A-58-128552 that the frictional element be released when the vehicle is at a standstill. In this case, the hydraulic fluid pressure supplied to the frictional element must be strictly controlled when the predetermined frictional element is engaged to start the vehicle moving from a standstill. A control system for controlling hydraulic fluid pressure for a frictional element is disclosed in JP-A-60-220247.

According to JP-A-60-220247, the rotational speed of a turbine shaft or of a transmission input shaft is detected, and an amount of slip of the frictional element is hydraulically controlled in such a manner that the detected rotational speed approaches a target value, thereby engaging the frictional element without substantial shock. However, this control system causes a hunting phenomenon to occur which increases as the deviation of the detected rotational speed $N_T$ increases relative to the target value $N_{T0}$. Thus, the transmission output torque curve peaks immediately after the transmission selector is moved from the N (neutral) range to the D (drive) range as shown in FIG. 9. The occurrence of this peak in the torque causes substantial shock to occur.

An object of the present invention is to provide an electro-hydraulic control system for controlling the pressure of hydraulic fluid predetermined supplied to a predetermined frictional element wherein hunting is suppressed to a satisfactorily low level even if a deviation of a detected input rotational speed from a target rotational speed is large.

SUMMARY OF THE INVENTION

According to the present invention, there is provided a control system for an automatic transmission having an output member and an input member that is drivingly connected via a torque converter to an engine, the automatic transmission including a predetermined frictional element for engagement to establish a predetermined torque delivery path. The control system comprises:

means for sensing the rotational speed of the input member of the automatic transmission and for generating a rotational speed signal indicative of the speed;

actuator means for hydraulically controlling engagement of the frictional element in response to a drive signal; and a control unit for receiving the rotational speed signal and for generating a drive signal, the drive signal being determined to reduce the difference, i.e., the error, between the actual value of the derivative of the rotational speed signal and a target value toward zero.

Another aspect of the present invention resides in a method for controlling engagement of a frictional element of an automatic transmission having an output member and an input member that is drivingly connected via a torque converter to an engine, the frictional element being engaged to establish a predetermined torque delivery path. The method comprises the steps of:

sensing a rotational speed of the input member of the automatic transmission and generating a rotational speed signal indicative of the speed;

hydraulically controlling engagement of the frictional element in response to a drive signal;

determining the drive signal to reduce the difference, i.e., the error, between an actual value of the derivative of said rotational speed signal and a target value toward zero.

BRIEF DESCRIPTION OF THE DRAWINGS

FIG. 6 shows actual engine speed when a target value engine speed is decreased linearly with time.

FIG. 7 illustrates transmission output torque variations in response to variations in hydraulic fluid pressure in accordance with the present invention;

DETAILED DESCRIPTION OF THE INVENTION

Figure 1:
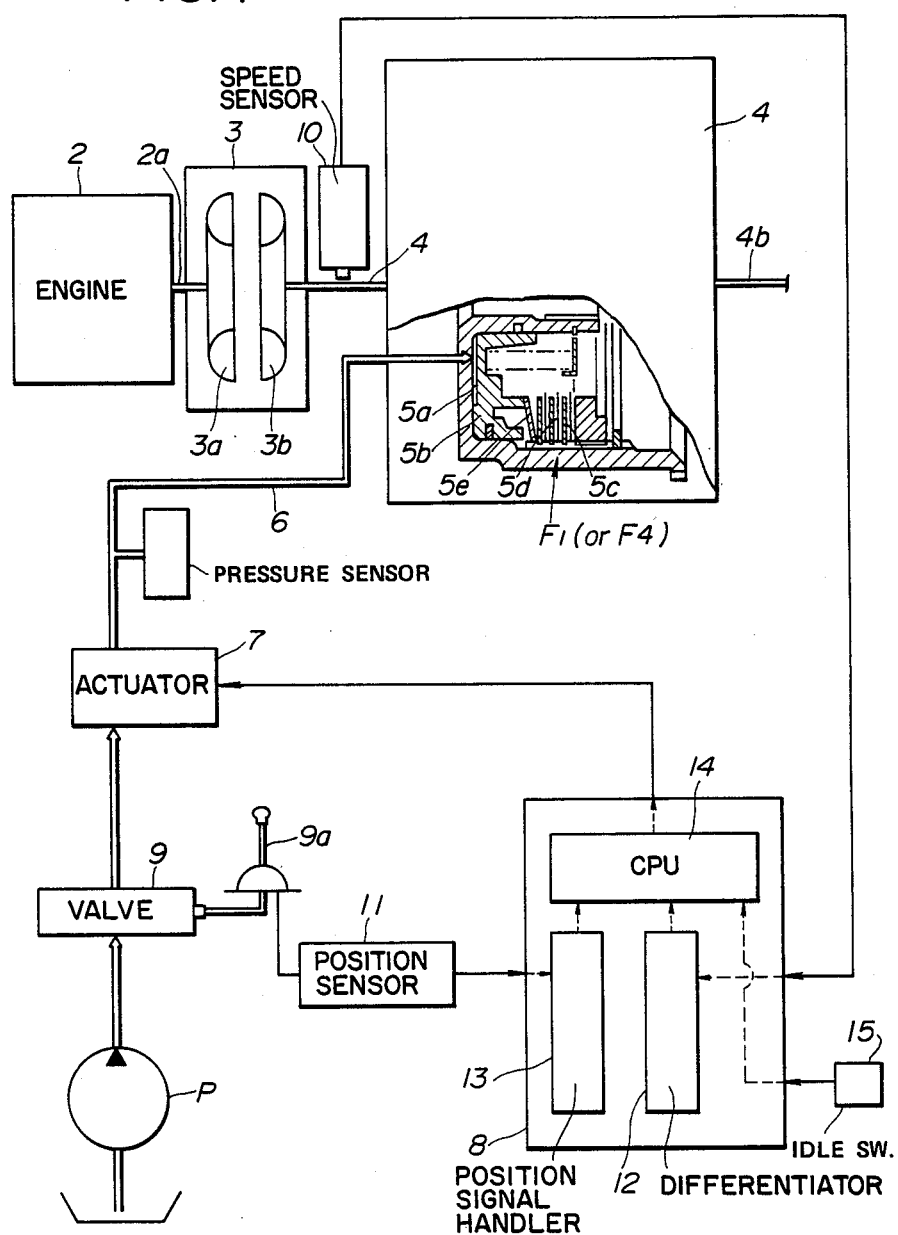
FIG. 1 is a schematic block diagram showing an embodiment of an electro-hydraulic control system according to the present invention.

Referring to FIG. 1, an electro-hydraulic control system according to the present invention is generally designated by a reference numeral 1. Reference numeral 2 designates an engine, 3 is a torque converter, and 4 is a gear train for an automatic transmission. The torque converter 3 includes a pump impeller 3a drivingly connected to a crankshaft 2a of the engine 2 and a turbine runner 3b drivingly connected via a turbine shaft to a transmission input shaft 4a.

Figure 2:
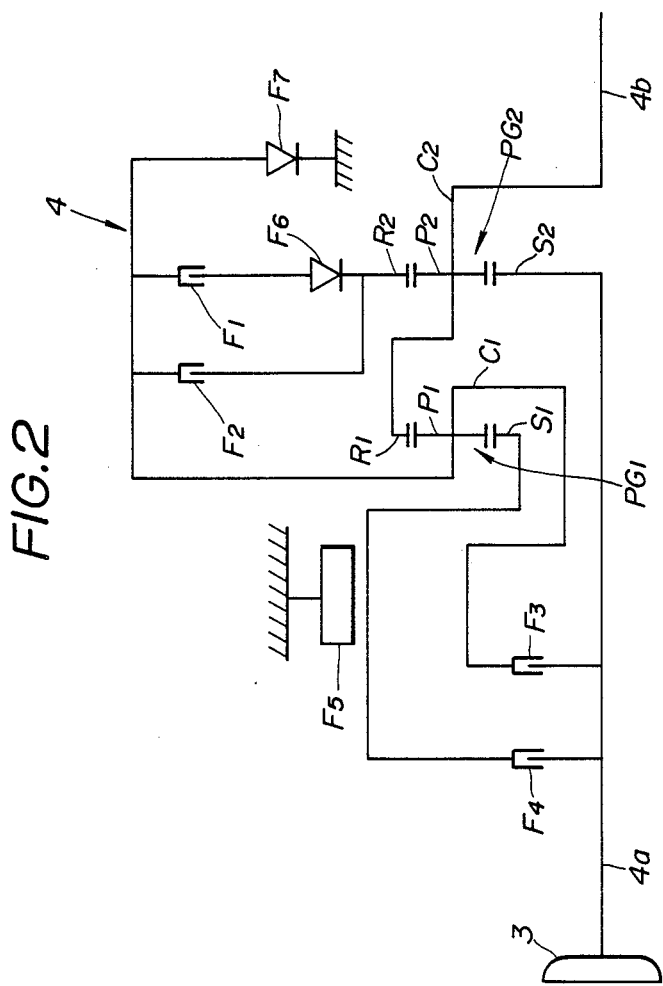
FIG. 2 is a schematic view of a power train of an automatic transmission associated with the control system of FIG. 1.

One example of the structure of the gear train 4 is described referring to FIG. 2. As shown in FIG. 2, the automatic transmission is connected to the torque converter 3 via the input shaft 4a, and it comprises a transmission output shaft 4b, a first planetary gear set $PG_1$, and a second planetary gear set $PG_2$. The first planetary gear set $PG_1$ includes a sun gear $S_1$ connectable via a clutch $F_4$ to the transmission input shaft 4a, a ring gear $R_1$, planetary pinions $P_1$ meshing with both the sun and ring gears $S_1$ and $R_1$, and a carrier $C_1$ rotatably supporting the planetary pinions $P_1$. The carrier $C_1$ is connectable via a clutch $F_3$ to the transmission input shaft 4a. The second planetary gear set $PG_2$ includes a sun gear $S_2$ connected to the transmission input shaft 4a, a ring gear $R_2$, planetary pinions $P_2$ meshing with both the sun and ring gears $S_2$ and $R_2$, and a carrier $C_2$ rotatably supporting the planetary pinions $P_2$. The carrier $C_2$ is connected to the ring gear $R_1$ and also to the transmission output shaft 4b. The carrier $C_1$ is connectable via a clutch $F_2$ to the ring gear $R_2$. Carrier $C_I$ is also connectable to ring gear $R_2$ via an overruning clutch $F_6$ when a clutch $F_1$ is engaged. A brake $F_5$ is provided to hold the sun gear $S_1$ stationary. One-way clutch $F_7$ is operatively disposed between the carrier $C_1$ and a stationary portion of the transmission.

The above mentioned frictional elements, i.e. clutches and brakes, are engaged and disengaged in a predetermined schedule to provide four forward ratios and one reverse ratio as shown in the following TABLE.

TABLE

| Ratio | $F_1$ | $F_6$ | $F_2$ | $F_5$ | $F_3$ | $F_7$ | $F_4$ |
|-------|-------|-------|-------|-------|-------|-------|-------|
| 1     |       |       | ( )   |       |       |       |       |
| 2     |       |       | ( )   |       |       |       |       |
| 3     |       |       | ( )   |       |       |       |       |
| 4     |       |       |       |       |       |       |       |
| R     |       |       |       |       |       |       |       |

In the above TABLE, the symbol "o" represents that a particular frictional element. The absence of a symbol means that the particular frictional element is released, i.e., not engaged. The symbol "(o)" means that a particular frictional element is engaged during engine brake operation.

In the embodiment illustrated in FIG. 1, the clutch $F_1$ is hydraulically controlled to reduce shocks occurring when the clutch $F_1$ is engaged to establish a first reduction ratio or first speed. As shown in FIG. 1, the clutch $F_1$ is constructed of multiple plates and is engaged by firm engagement of drive plates 5c and driven plates 5d. Plates 5c and 5d are engaged by bias force applied by a piston 5b when extended in response to an increase in hydraulic pressure within a cylinder 5a. The clutch $F_1$ is released when the hydraulic pressure decreases and fluid flows out of the cylinder 5a. The reference numeral 5e designates a dash plate for avoiding a rapid increase in the bias force applied by the piston 5b. A hydraulic fluid supply line 6 is connected to the cylinder 5a hydraulic fluid is supplied to supply line 6 under pressure via a transmission valve 9 operatively connected to a transmission selector 9a. The transmission valve 9 is connected to a hydraulic fluid pressure pump P. An actuator in the form of an electromagnetic proportional type solenoid valve 7 is provided in the hydraulic fluid supply line 6 to control the flow rate of the hydraulic fluid supplied to the cylinder 5a of the clutch $F_1$. This solenoid valve 7 is actuated by a drive signal provided by a microcomputer based control unit 8.

Figure 3:
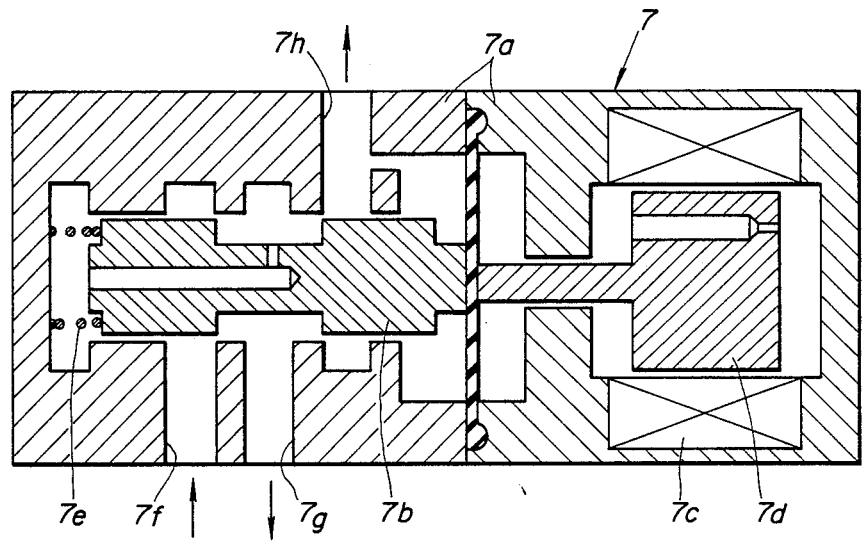
FIG. 3 is a diagrammatic sectional view illustrating a proportional type solenoid operated actuator.

The structure of the electromagnetic solenoid valve 7 is diagrammatically illustrated in FIG. 3. The solenoid valve 7 includes a valve body 7a, a spool 7b, and a plunger 7d that is electromagnetically actuated by a solenoid coil 7c. When the plunger 7d is actuated, the plunger 7d is moved to the left as viewed in FIG. 3, urging the spool 7b against a biasing force applied by a spring 7e disposed between the body 7a and the spool 7b. The valve body 7a is provided with an inlet port 7f, an outlet port 7g, and a drain port 7h. The inlet port 7f communicates with the transmission valve 9, while the outlet port 7g communicates with the cylinder 5a. Hydraulic fluid may flow from the transmission valve 9 via the inlet port 7f and the outlet port 7g to the cylinder 5a. In the illustrated position of the spool 7b, fluid communication between the outlet port 7g and the inlet port 7f and between the outlet port 7g and the drain port 7h are blocked. If the spool 7b is moved from the illustrated position to the left as viewed in FIG. 3, the outlet port 7g is placed in communication with the inlet port 7f, so that hydraulic fluid may flow to the cylinder 5a of the clutch $F_1$ from the transmission valve 9.

If the spool 7b is moved from the illustrated position to the right as viewed in FIG. 3, the outlet port 7g is placed in communication with the drain port 7h, so that hydraulic fluid may be discharged from and flow from the cylinder 5a of the clutch $F_1$ toward transmission valve 9.

The hydraulic fluid pressure within the outlet port 7g flows via an axial bore formed in the spool 7b to a spring chamber where the spring 7e is disposed thereby assisting the spring 7e in biasing the spool 7b to the right as viewed in FIG. 3.

Figure 4:
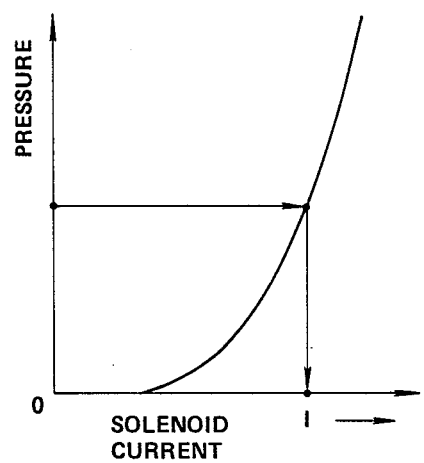
FIG. 4 is a hydraulic pressure output versus solenoid current characteristic curve.

FIG. 4 shows the relationship between output hydraulic fluid pressure within the outlet port 7g and the intensity I of the electric current flowing through the solenoid coil 7c. As will be noted from this relationship, there is a one-to-one correspondence between the output hydraulic fluid pressure and the electric current flowing through the solenoid coil 7c.

Referring back to FIG. 1, two sensors 10 and 11 are provided. One sensor is an input shaft rotational speed sensor 10 for measuring the rotational speed (i.e., rpm) of the transmission input shaft 4a (or the rotational speed of the turbine 3b of the torque converter 3). The other sensor is a position sensor 11 for detecting the position of the transmission selector 9a. Output signals of the sensor 10 and the sensor 11 are supplied to the control unit 8. Also supplied to the control unit 8 is an output signal from an idle switch 15.

Referring to FIG. 1, the function of the control unit 8 is briefly described. In a block 12, the derivative of the turbine speed indicative signal, NT, is calculated. The position of the transmission selector 9a is recognized at a block 13. The transmission selector 9a can be moved from an N (neutral) position to an R (reverse) range position and to running range positions, the running range positions including a D (drive) range position, a II range position and an I range position. The II and I range positions are provided for effecting engine brake operation. Output signals from the blocks 12 and 13 are supplied to a block 14. Also supplied to the block 14 is an output signal from the idle switch 15. At the block 14, the intensity of electric current to be supplied to the solenoid valve 7 is calculated based on the signals supplied thereto.

The operation performed by the control unit 8 is described in detail with reference to the flow chart diagram shown in FIG. 5.

Figure 5:
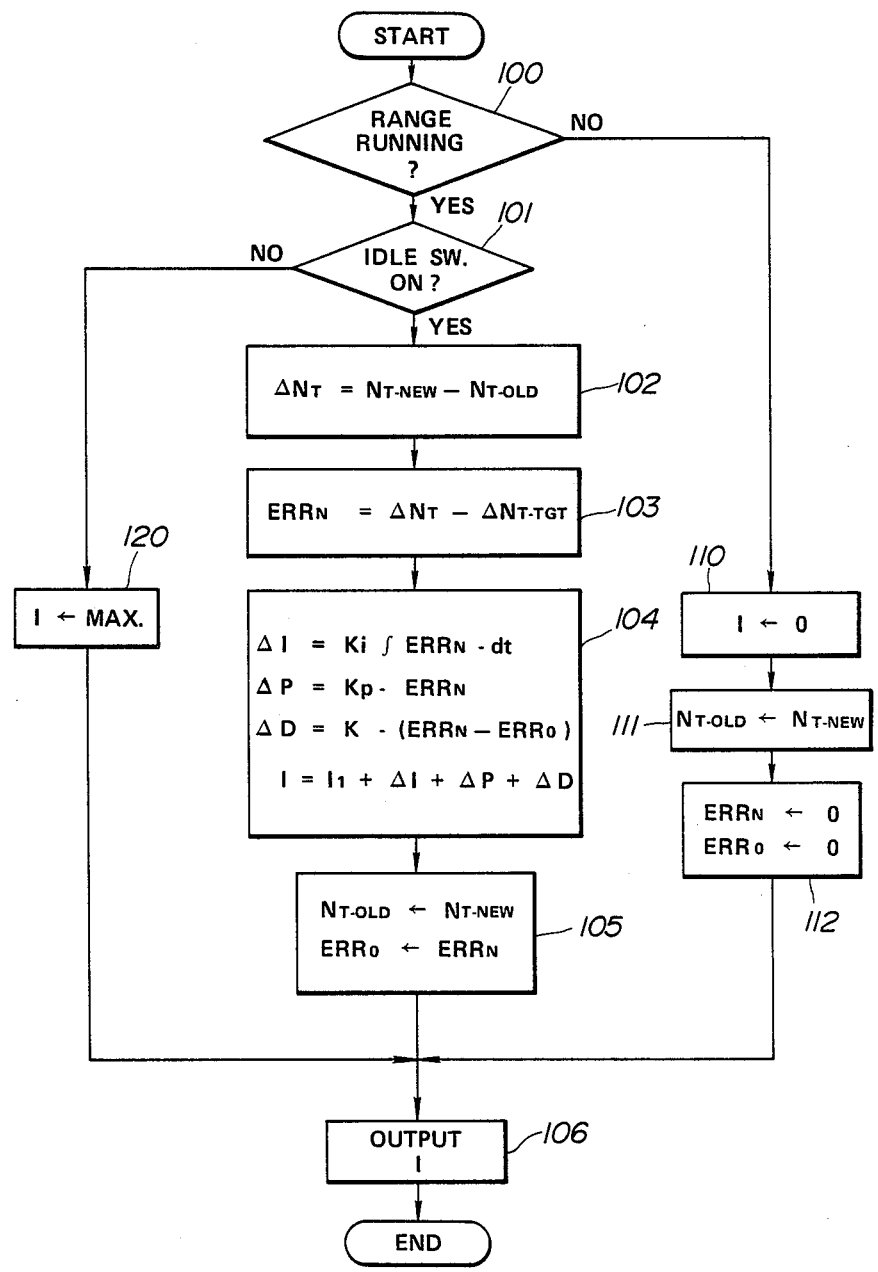
FIG. 5 is a flow chart showing a control characteristic employed by the control of FIG. 1.

The execution of steps illustrated in the flow chart shown in FIG. 5 is initiated after a predetermined time has elapsed. The output signals from the input shaft speed sensor 10, position sensor 11, and idle switch 15 are read in a sub-routine step not illustrated.

In FIG. 5, it is determined at a step 100 based on the output signal from the position sensor 11 whether the transmission selector 9a is placed at any one of the running range positions, i.e., D or II or I range position. If the range position selected is one of the running range positions, step 101 is executed where it is determined, based on the output signal of the idle switch 15 whether the idle switch is turned ON (i.e., closed). With the execution of the steps 100 and 101, it is recognized whether the vehicle is about to start up even though the vehicle is at a standstill or whether the vehicle has already begun to start up. If the idle switch is turned ON, step 102 is executed where the derivative of input shaft speed $\Delta N_T$ is determined by calculating an equation $N_{T.NEW}-N_{T.OLD} \cdot N_{T.NEW}$ denotes the input shaft speed obtained in the present run, while $N_{T.OLD}$ denotes the stored input shaft revolution speed from the previous run. At step 103, an error or deviation $ERR_N$ is determined by calculating an equation $\Delta N_T - \Delta N_{T.TGT} \cdot \Delta N_{T.TGT}$ denotes the target derivative of input shaft speed stored in the memory of the microcomputer. At step 104, the time integral factor $\Delta I$ of the error $ERR_N$, the proportional factor $\Delta P$ of the error $ERR_N$, and the derivative factor $\Delta D$ of the error $ERR_N$ are determined. The intensity I of the electric current flowing through the solenoid valve 7 is also determined in step 104 as the sum of $I_1$, the time integral $\Delta I$, proportional factor $\Delta P$, and derivative $\Delta D$, where $I_1$ is constant. The integral gain, proportional gain, and derivative gain are represented by $K_I$, $K_P$, and $K_D$, respectively. $ERR_O$ represents an error determined in the previous run. After the step 104, step 105 is executed where the data $N_{T.OLD}$ is set equal to the data $N_{T.NEW}$, and the data $ERR_O$ is set equal to $ERR_N$. The intensity I of electric current is output at step 106. As a result, the intensity of the electric current flowing through the solenoid valve 7 is set to the intensity I output at the step 106.

If, at the step 100, it is determined that the transmission selector 9a is in the neutral position, the control proceeds from the step 100 to steps 110-112. In step 110, the intensity I of current is set equal to zero, at step 111, $N_{T.OLD}$ is set equal to $N_{T.NEW}$, and at step 112 $ERR_N$ and $ERR_O$ are set equal to zero, respectively. Thus, at the step 106, the current intensity I=0 is output. Since no electric current flows through the solenoid valve 7, the clutch $F_1$ is completely released, i.e., disengaged.

If, at the step 101, it is determined that the idle switch is turned OFF, the control proceeds to step 120 where the intensity I of current is set equal to the maximum value. The maximum intensity of electric current is output the step 106. When the intensity of electric current flowing through the solenoid valve 7 is set equal to the maximum value, the clutch $F_1$ is firmly engaged. Thus, the clutch $F_1$ is firmly engaged immediately after it is determined that the vehicle has started up.

Figure 8:
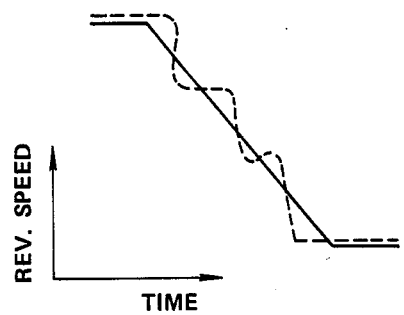
FIG. 8 illustrates experimental data for prior art apparatus illustrating a variation in actual engine speed when a target engine speed varies with time according to the solid line of FIG. 8.

Referring to FIG. 6, the solid line shows a variation in a target value in input shaft speed with respect to time t. The broken line curve shows a variation in an actual value of input shaft speed when the engagement of the clutch $F_1$ is controlled by the control system according to the present invention and the manual selector 9a is moved from the N range position to the D range position. It can be recognized from FIG. 6, compared to the graph shown in FIG. 8, that the hunting phenomenon is suppressed in the present invention.

Figure 9:
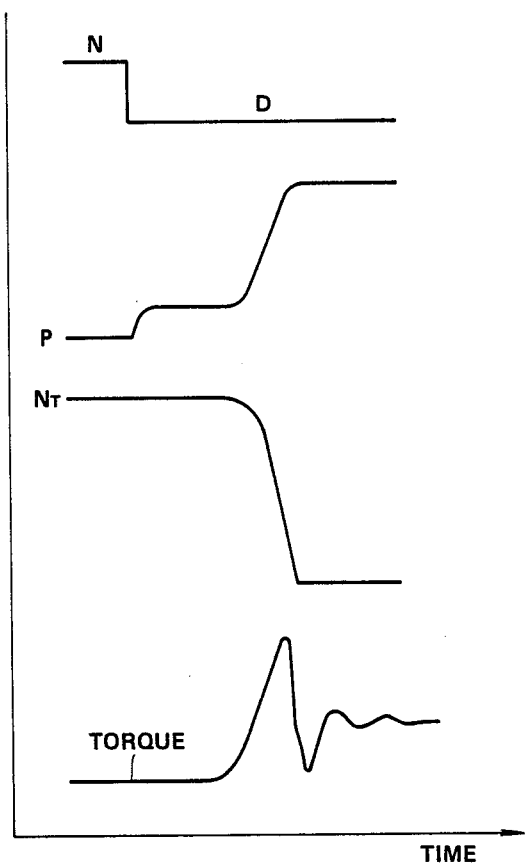
FIG. 9 shows transmission output torque variations in response to variations in hydraulic fluid pressure in accordance with the prior art.

FIG. 7 shows how the hydraulic pressure P supplied to the clutch $F_1$, actual input shaft revolution speed $N_T$ and transmission output shaft torque vary according to the present invention when the transmission selector 9a is moved from the N position to the D position. It will be appreciated from a comparison of FIG. 7 with FIG. 9 that the peak in the torque shown in FIG. 9 is absent from FIG. 7. As a result, the clutch $F_1$ is engaged without substantial shock.

In the embodiment described above, a closed loop control based on an error between the derivative of an input shaft speed of a frictional element and a target speed controls the hydraulic fluid supply to the frictional element when the element is to be engaged. A clutch $F_1$ which is to be engaged upon moving a transmission selector from a neutral range position to a running range position is controlled. However, the application of this closed loop control is not limited to this example. It may well be understood to those skilled in the art that this control described in connection with the illustrated embodiment can be applied to a clutch $F_4$ (see FIG. 2) which is to be engaged when the selector 9a is moved from the N range position to the R range position (reverse). Without any substantial modification, the control may be applied to the other frictional elements shown in FIG. 2.

What is claimed is:

1. In an automatic transmission having an output member and an input member that is drivingly connected to a torque converter which in turn is drivingly connected to an engine,
 a frictional element that may be engaged in response to the flow of a hydraulic fluid to establish a torque delivery path in the automatic transmission, said frictional element being driven through the input member;
 means, including a transmission valve which may be selectively placed in any of a plurality of running range positions and in a neutral range position, for supplying hydraulic fluid toward said frictional element when said transmission valve is shifted from the neutral range position to one of the running range positions;
 means for sensing the speed of the input member of the automatic transmission and for generating a speed signal indicative of the speed;
 means for sensing the idling state of the engine and for generating an idling signal indicative of the idling state of the engine;
 a control unit including means receiving the speed signal and the idling signal for generating, only when the engine is in an idling state, a derivative signal indicative of the derivative with respect to time of the speed signal, means for generating a target derivative signal indicative of a target value of the derivative signal, and means for generating an error signal indicative of the difference between the derivative signal and the target derivative signal, and means responsive to the error signal for generating an output signal; and
 means responsive to said output signal for controlling said hydraulic fluid supplying means to reduce said error signal toward zero.

2. An automatic transmission as claimed in claim 1 wherein said input member is a rotatable shaft and said means for sensing senses the rotational speed of said shaft.

3. In an automatic transmission having an output member and an input member that is drivingly connected to a torque converter which in turn is drivingly connected to an engine, a method of reducing shock during engagement of a frictional element that may be engaged to establish a torque delivery path in the automatic transmission in response to the flow of hydraulic fluid from a transmission valve which may be selectively placed in a number of running range positions and in a neutral range position when the transmission valve is shifted from the neutral range position to one of the running range positions, said method comprising:
- sensing the speed of the input member of the automatic transmission and generating a speed signal indicative of the speed;
- sensing the position of the transmission valve and generating a range signal indicative of the position sensed;
- sensing the idling state of the engine and generating an idling signal indicative of the idling state of the engine;
- calculating the derivative with respect to time of the speed signal and generating a derivative signal indicative of the derivative calculated only when the idling signal indicates the engine is idling;
- generating, in response to the range signal, a target derivative signal indicative of a target value of the derivative signal;
- calculating the difference between the derivative signal and the target derivative signal and generating an error signal indicative of the difference;
- generating an output signal in response to said error signal; and
- regulating the supply of hydraulic fluid from the transmission valve to the frictional element in response to the output signal to reduce the error singal toward zero.

4. In a vehicle having an engine, a torque converter having a pump impeller drivingly connected to the engine and a turbine runner:
- an input member drivingly connected to the turbine runner;
- an output member driven by the input member;
- a planetary gear set having a sun gear drivingly connected to said input member, a ring gear, a planet carrier drivingly connected to said output member, said planet carrier rotatably supporting a planet pinion meshing with said ring and sun gears;
- a frictional element operatively disposed between said ring gear and a stationary portion, said frictional element being hydraulically engaged to restrain rotation of said ring gear;
- means, including a transmission valve which may be selectively placed in any of a plurality of running range positions and in a neutral range position, for supplying hydraulic fluid toward said frictional element when said transmission valve is shifted from the neutral range position to one of the running range positions;
- means for sensing the speed of said input member and for generating a speed signal indicative of the speed;
- means for sensing the idling state of the engine and for generating an idling signal indicative of the idling state of the engine;
- a control unit including means receiving the speed signal and the idling signal for generating, only when the engine is in an idling state, a derivative signal indicative of the derivative with respect to time of the speed signal, means for generating a target derivative signal indicative of a target value of the derivative signal, and means for generating an error signal indicative of the difference between the derivative signal and the target derivative signal, and means responsive to the error signal for generating an output signal; and
- means responsive to said output signal for controlling said hydraulic fluid supplying means to reduce said error signal toward zero.

5. In a vehicle having an engine, a torque converter having a pump impeller drivingly connected to the engine and turbine runner;
- an input member drivingly connected to the turbine runner;
- an output member driving by the input member;
- a planetary gear set having a sun gear, a ring gear drivingly connected to said output member, a planet carrier, said planet carrier rotatably supporting a planet pinion meshing with said ring and sun gears;
- a one-way clutch operatively disposed between said planet carrer and a stationary portion and restraining rotation of said planet carrier;
- a frictional element operatively disposed between said input member and said sun gear, said frictional element being hydraulically engageable to drive said sun gear from said input member;
- means, including a transmission valve which may be selectively placed in any of a plurality of running range positions and in a neutral range position, for supplying hydraulic fluid toward said frictional element when said transmission valve is shifted from the neutral range position to one of the running range positions;
- means for sensing the speed of the input member of said automatic transmission and for generating a speed signal indicative of the speed;
- means for sensing the idling state of the engine and for generating an idling signal indicative of the idling state of the engine;
- a control unit including means receiving the speed signal and the idling signal for generating, only when the engine is in an idling state, a derivative signal indicative of the derivative with respect to time of the speed signal, means for generating a target derivative signal indicative of a target value of the derivative signal, and means for generating an error signal indicative of the difference between the derivative signal and the target derivative signal, and means responsive to the error signal for generating an output signal; and
- means responsive to said output signal for controlling said hydraulic fluid supplying means to reduce said error signal toward zero.

* * * * *